United States Patent
Horwath et al.

(10) Patent No.: US 6,615,944 B1
(45) Date of Patent: Sep. 9, 2003

(54) VEHICLE WITH AUXILIARY REAR WHEEL STEERING MECHANISM

(75) Inventors: Jochen Horwath, Unterensingen (DE); Ralf Kaufmann, Walldürn (DE); Claus Kochendörfer, Kernen (DE); Hans-Christian Pflug, Remshalden (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/831,654

(22) PCT Filed: Oct. 20, 1999

(86) PCT No.: PCT/EP99/07976
§ 371 (c)(1),
(2), (4) Date: Jun. 25, 2001

(87) PCT Pub. No.: WO00/29274
PCT Pub. Date: May 25, 2000

(30) Foreign Application Priority Data

Nov. 12, 1998  (DE) .......................... 198 52 155

(51) Int. Cl.⁷ .................................................. B60S 9/00
(52) U.S. Cl. .................. 180/204; 180/410; 180/411; 280/100
(58) Field of Search ..................... 180/204, 445, 180/446, 408–415; 280/99–100, 91.1, 91

(56) References Cited

U.S. PATENT DOCUMENTS

| | | | | |
|---|---|---|---|---|
| 4,513,639 A | * | 4/1985 | Hiramatsu | 74/866 |
| 4,958,698 A | * | 9/1990 | Kirschner | 180/408 |
| 5,024,305 A | * | 6/1991 | Kurihara et al. | 192/0.055 |
| 5,168,948 A | * | 12/1992 | Rohringer et al. | 180/414 |
| 5,741,200 A | * | 4/1998 | Taniguchi et al. | 477/93 |
| 5,799,259 A | * | 8/1998 | Rief et al. | 180/415 |
| 6,148,253 A | * | 11/2000 | Taguchi et al. | 701/48 |

FOREIGN PATENT DOCUMENTS

| | | |
|---|---|---|
| DE | 35 06 048 | 8/1985 |
| DE | 39 29 994 | 3/1990 |
| DE | 41 40 124 | 12/1992 |
| DE | 43 41 636 | 6/1995 |
| DE | 44 13 413 | 6/1995 |
| JP | 2-249766 | 10/1990 |
| JP | 5-229449 | 9/1993 |

* cited by examiner

Primary Examiner—Lesley D. Morris
Assistant Examiner—Matthew Luby
(74) Attorney, Agent, or Firm—Kenyon & Kenyon

(57) ABSTRACT

A nontrack-bound vehicle with arbitrarily steerable front wheels includes an additional rear-wheel steering system that operates automatically or may be switched to automatic operation and controls or regulates the steering angle of the rear wheels as a function of the steering angle of the front wheels and of further parameters. The additional rear-wheel steering system switches in a parameter-dependent manner between a drive-away mode and a normal mode to improve maneuverability and to reduce the swinging out of the rear during the drive-away mode. In the drive-away mode, the steering angle of the rear wheels is controlled or regulated so that the rear wheels are not adjusted beyond a steering angle assumed when the vehicle last halted.

13 Claims, 1 Drawing Sheet

VEHICLE WITH AUXILIARY REAR WHEEL STEERING MECHANISM

FIELD OF THE INVENTION

The present invention relates to a nontrack-bound vehicle with arbitrarily steerable front wheels and an additional rear-wheel steering system that operates automatically or can be switched to automatic operation and controls or regulates the steering angle of the rear wheels as a function of the steering angle of the front wheels and of further parameters such as the vehicle speed or the distance traveled, the additional rear-wheel steering system switching in a parameter-dependent manner between a drive-away mode and a normal mode.

BACKGROUND INFORMATION

Generally, normal road vehicles with arbitrarily steerable front wheels and nonsteerable rear wheels have a short wheelbase in comparison with the length of the vehicle. Mention may be made here of large buses. This type of construction considerably facilitates steering maneuvers when traveling along narrow and winding routes, in old towns for instance. On the other hand, a long wheelbase is advantageous in regard to directional stability of the vehicle at higher speeds. In the case of a long wheelbase, the wheel housings can furthermore be placed well toward the front and rear, allowing better use to be made of the space within the vehicle and, in addition, an improvement in the use of axle loads to be achieved.

When designing a vehicle, an optimum compromise must therefore be found between easy maneuverability when steering in confined spaces and directional stability at high speed.

In the case of vehicles of the type described above, ease of handling on narrow and winding routes can be achieved even with a (very) long wheelbase and correspondingly good directional stability at high speed. Owing to the additional rear-wheel steering system, the rear wheels are actuated in the opposite direction to a steering movement of the front wheels, and the vehicle's body thus moves relative to the underlying surface when cornering as though the vehicle had a significantly shorter wheelbase and nonsteerable rear wheels. This concept is described in German Published Patent Application No. 39 29 994, for example.

If a vehicle of this kind has a relatively long rear overlap behind the rear axle, this vehicle may get into a position close to a fixed obstacle extending parallel to the longitudinal direction of the vehicle. It is difficult for the driver to move the vehicle out of this position and away from the obstacle when driving on. This is because the front wheels must then only be deflected slightly out of their straight-ahead position in the direction away from the wall as otherwise the rear will swing out excessively in the direction of the obstacle owing to the oppositely deflected rear wheels and will collide with it. This problem occurs, for example, when the vehicle is parked close to a loading ramp parallel to the vehicle for loading or unloading and has then to be moved away from it again after the loading operation. The same problem arises, for example, with a bus that drives into a halt and there stops parallel and close to a curb. If the driver then turns the front wheels sharply in a direction away from the curb, the rear wheels will ride over the curb when subsequently starting off. This would be an unacceptable handling response from the point of view of the comfort and safety of the passengers and of passers-by.

As described in German Published Patent Application No. 41 40 124, this problem can be solved by providing vehicles that have a long rear overhang with an additional rear-wheel steering system that can be controlled in such a way that, when cornering, a point on the rear of the vehicle follows the curve of the path of an analogous point on the front of the vehicle. The result is that, as they leave a vehicle position close to an obstacle or a wall, the rear wheels are initially deflected in the same direction as the front wheels, the steering of which is actuated by the driver. This allows the driver to steer the front wheels in almost any desired manner in a direction away from the obstacle or wall.

These problems are also addressed in German Published Patent Application No. 35 06 048, which describes a method of steering for an all-wheel steering system in which the rear of the vehicle is prevented from swinging out excessively towards the outside of a bend when the front wheels are turned sharply at low speed in order, for example, to make it easier for the driver to turn straight out of a narrow thoroughfare without the risk of a collision between the rear of the vehicle and the boundaries of the thoroughfare.

In this context, German Published Patent Application No. 44 13 413 describes that, in the case of vehicles with a wheelbase that is long in comparison with their length and with steerable rear wheels, the rear-wheel steering can be set automatically or manually to a particular operating mode in which, during a driving phase following a halt or at a speed below a low minimum vehicle speed and given arbitrary deflection of the front wheels out of a straight-ahead position or a position adjacent thereto, the rear wheel that is on the outside of the bend initially follows a path that connects the front- and rear-wheel contact areas defined during a halt or at a speed below the minimum speed approximately in a straight line on the side of the vehicle that is on the outside of the curve or runs on that side of a straight line connecting the said wheel contact areas that is on the inside of the curve. On the one hand, this measure ensures that, when leaving a halt in a direction away from a curb, the rear wheels do not run over the curb at least when the driver has by his steering maneuvers avoided running over the curb with the front wheels, as is customary and easily possible. On the other hand, a kinematic behaviour similar to that with a vehicle that has a shorter wheelbase and nonsteerable rear wheels is achieved even during this special operating mode.

German Published Patent Application No. 43 41 636 describes a vehicle in which the adjustment of the rear wheels when driving away and steering away from the straight-ahead driving position follows the steering movement of the front wheels with a time delay. A steering characteristic of this kind is intended to avoid a situation where a corner of the rear of the vehicle on the outside of a bend travels over an obstacle, e.g., a curb, disposed to the side of the vehicle when driving away.

It is an object of the present invention to improve the maneuverability of a vehicle of the type described above and to reduce the swinging out of the rear when driving away.

SUMMARY

According to the present invention, the above and other beneficial objects are achieved by virtue of the fact that, in the drive-away mode, the steering angle of the rear wheels is controlled or regulated so that the rear wheels are not adjusted beyond a steering angle, referred to below as the halt steering angle, assumed when the vehicle last halted.

The present invention is based on the principle that the rear-wheel steering angles with which the vehicle can drive through a halt are uncritical for the passengers, passers-by and for the vehicle. Accordingly, swinging out of the rear of the vehicle that takes place at these rear-wheel steering angles is not dangerous, even if the vehicle's progress is interrupted by a halt and it continues with a drive-away process. In other words, if the vehicle travels into a halt on a curved track, i.e., with its wheels turned to a greater or lesser extent, it can be assumed that the entire curve can be traveled with the steering angles that occur during this process and that the rear can likewise travel through this curve of the halt by following the front. This is entirely irrespective of whether the vehicle leaves the halt forwardly or backwardly.

The control of the steering in accordance with the present invention ensures that, at steering angles up to the halt steering angle, the rear wheels have the same dependence on the steering angle of the front wheels in the drive-away mode as in the normal mode. The halt steering angle for the rear wheels simulates a steering stop beyond which the rear wheels cannot go during further steering movement at the front wheels. At front-wheel steering angles that would produce a rear-wheel steering angle that goes beyond the halt steering angle in the normal mode, the rear wheels remain constantly at the halt steering angle.

In a first extreme case, in which the halt is approached at the maximum steering angle, the drive-away mode is accordingly identical with the normal mode since then the halt steering angle coincides with the maximum rear-wheel steering angle that can be set in the normal mode. In another extreme case, when the vehicle approaches a halt substantially tangentially, the halt steering angle has a minimum value, in particular the value zero, with the result that the drive-away mode then corresponds substantially to operation of a vehicle without rear-wheel steering.

The steering system according to the present invention manages without complex calculations of the course of the rear of the vehicle and may thus be implemented with a relatively low outlay. The swinging out of the rear of the vehicle is nevertheless reduced and the vehicle's maneuverability is improved.

In one example embodiment of the vehicle according to the present invention, the additional rear-wheel steering system detects when the vehicle is halting from the fact that a predetermined vehicle limiting speed is undershot. This is of particular significance, for example, when the vehicle has to travel very close to a wall, which generally should be performed at a relatively low speed. If the system did not switch to the drive-away mode in this case, a sharp turn of the steering away from the wall would inevitably lead to a collision between the wall and the rear of the vehicle.

The additional rear-wheel steering system may switch from the drive-away mode to the normal mode when the rear wheels assume a steering angle that is smaller than the halt steering angle. As an additional parameter to be satisfied, it may be stipulated, for example, that the rear wheels should approximately reach the point at which the front wheels were positioned during the last halt. As an alternative or additional measure, it may furthermore be stipulated that the vehicle should exceed a predetermined limiting speed. The switch from the drive-away mode to the normal mode therefore occurs completely unnoticed by the driver, thus ensuring that no unexpected steering movements can occur. In addition to the parameter-dependent switch, a corresponding switch in the cockpit of the vehicle may be actuated by the driver to manually activate and deactivate the drive-away mode.

According to another example embodiment of the vehicle according to the present invention, the halt steering angle may be determined both when halting in forward motion and when halting in reverse and may be maintained in the subsequent drive-away mode both when traveling forward and when traveling backward. This measure ensures that the vehicle has no problem in leaving a curved track (e.g., a parking lot in the form of a cul-de-sac), which it has been able to enter forwardly or backwardly, by traveling in the opposite direction.

In the vehicle according to the present invention, only the absolute value of the halt steering angle may be determined, thus allowing steering movements to the left and to the right only up to the absolute value of the halt steering angle. This measure has the effect, for example, that a vehicle that comes to a halt while traveling straight ahead behaves like a vehicle without steered rear wheels in the subsequent drive-away mode.

It should be appreciated that the features mentioned above and those that will be mentioned below may be employed not only in the respectively indicated combination but also in other combinations or in isolation without departing from the scope of the present invention.

DETAILED DESCRIPTION

Figure 1:
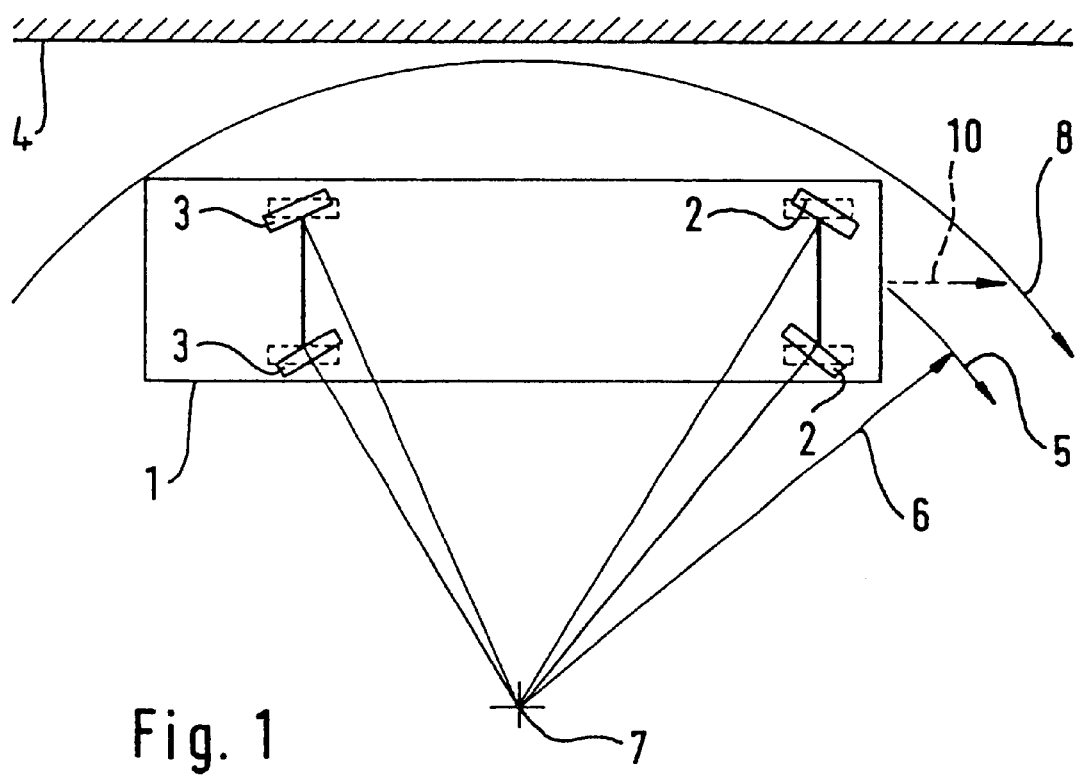
FIG. 1 is a schematic plan view of a vehicle designed in accordance with the present invention for the purpose of explaining the operation of the vehicle steering in the case of a halt that involves a sharp turn of the steering.
Figure 2:
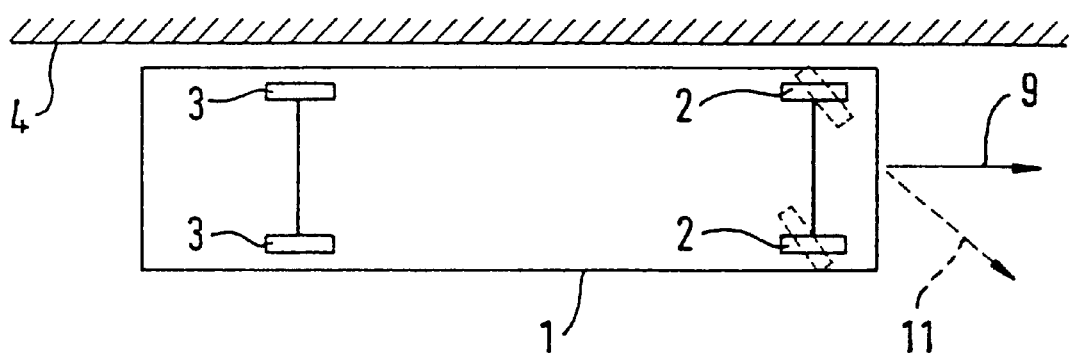
FIG. 2 is a plan view like that of FIG. 1 but in the case of a halt that involves a small turn of the steering.

According to FIGS. 1 and 2, a vehicle 1 according to the present invention, which may be a bus, for example, includes steerable front wheels 2, which are steered at will by a driver of the vehicle 1. The vehicle 1 furthermore includes steerable rear wheels 3, which are steered in a manner dependent on the front wheels 2 by an additional rear-wheel steering system (not shown). To simplify the illustration, the vehicle described in the example embodiment is in each case fitted with just one front axle, which includes the steerable front wheels, and one rear axle, which includes the steerable rear wheels. However, it should be appreciated that the present invention could also be applied to vehicles that include more than two axles and, in particular, more than two axles with steerable wheels.

As illustrated in FIGS. 1 and 2, the vehicle 1 is substantially parallel to its longitudinal direction and next to an obstacle 4, which may be a curb, the wall of a house or a loading ramp, for example.

The additional rear-wheel steering system includes a normal mode, in which there may be a proportional dependence between the steering angles of the front wheels 2 and the steering angle of the rear wheels 3, which is set by the open-or closed-loop control system of the additional rear-wheel steering system. In this context, this proportional dependence may exist over the entire range of steering angles of the front wheels, i.e., the rear wheels 3 reach a maximum steering angle, e.g., in the form of a steering-angle stop, only when the front wheels also assume their maximum steering angle. Another possible configuration is one in which the rear wheels reach their maximum steering angle before the front wheels have even reached their maximum steering angle. In this case, the rear wheels have a constant steering angle, namely their maximum steering angle, when the steering angles of the front wheels increase.

The dependence of the steering actuation of the rear wheels on the steering actuation of the front wheels may also be coupled with further parameters. For example, the proportionality between the rear-wheel steering angles and the front-wheel steering angles may be dependent on vehicle speed. From a vehicle speed of zero up to a first limiting speed, the maintenance of a constant proportionality factor for the dependence of the rear-wheel steering angles on the front-wheel steering angles may be preferred. From this first limiting speed up to a second limiting speed, the dependence of the rear-wheel steering angles on the front-wheel steering angles has a proportionality factor that decreases to the value zero linearly, for example. From this second limiting speed, the proportionality factor has a constant value of zero. This means that the vehicle's handling is that of a vehicle without rear-wheel steering from the second limiting speed onward.

As illustrated in FIG. 1, the vehicle 1 is following a curved path 5 through a relatively tight bend with a correspondingly small radius 6 relative to a center 7 of the bend. The front wheels 2 and the rear wheels 3 have correspondingly large steering angles. If the vehicle 1 travels past the obstacle 4 along a curved path 5 of this kind, there is inevitably a relatively large distance between the vehicle 1 and the obstacle 4 in the state illustrated, in which the vehicle 1 is aligned essentially parallel to the rectilinear obstacle 4. During this process, the additional rear-wheel steering system operates so that the rear of the vehicle 1 will definitely not travel radially beyond the outer trajectory, indicated by 8, of the front of the vehicle along such a curved path 5. Accordingly, it can be assumed that, provided the curved path 5 is negotiated correctly, there is no risk of collision between the rear of the vehicle and the obstacle 4. Based on this realization, the invention assumes that a rear-wheel steering angle set when traveling along a curved path 5 will be uncritical even if motion along the curved path 5 is interrupted, e.g., by the vehicle halting.

If the vehicle 1 follows a straight-ahead path 9 approximately tangential or parallel to the obstacle as illustrated in FIG. 2, the front wheels 2 and the rear wheels 3 have correspondingly small steering angles. In this case, the vehicle 1 may come relatively close to the obstacle 4. If the vehicle 1 then changes its trajectory abruptly, e.g., in order to move away from the obstacle 4, the front wheels 2 have the steering angle indicated by broken lines. If in this case the rear wheels 3 were actuated in accordance with the dependence that prevailed in the normal mode, this would inevitably result in a collision between the rear of the vehicle and the obstacle 4. If the obstacle 4 is a curb, the rear wheels 3 can ride over it.

The vehicle 1 according to the present invention operates as follows:

When the vehicle 1 is coming to a halt, the additional rear-wheel steering system switches from normal mode to a drive-away mode. In this case, the steering angle assumed by the rear wheels 3 when stopping is stored and defined as the maximum steering angle for the duration of the subsequent drive-away phase of the vehicle 1. In other words, during the drive-away process that follows the halt, the rear wheels 3 cannot be set to a steering angle greater than the steering angle that they assumed when coming to a halt. The steering angle assumed by the rear wheels 3 as the vehicle 1 comes to a halt is also referred to below as the "halt steering angle".

In accordance with the present invention of the additional rear-wheel steering system, a new maximum steering angle is defined for the rear wheels 3 for the drive-away mode. Otherwise, the dependence, in particular the proportionality between the rear-wheel steering angles and the front-wheel steering angles, remains unaffected. This means that in the drive-away mode, the coupling of the rear-wheel steering to the steering actuation of the front wheels 2 corresponds to the normal mode until the halt steering angle is reached. Only in the case of front-wheel steering angles that, in normal mode, would produce rear-wheel steering angles that were larger than the current halt steering angle do the rear wheels 3 remain constantly at the halt steering angle, the latter thus performing the function of a stop.

When the vehicle 1 performs a halt on a curved path 5, as illustrated in FIG. 1, this means that the relatively large steering angle assumed by the rear wheels 3 during the halt may be reassumed by the rear wheels 3 when the vehicle subsequently drives away. This is not critical since it can be assumed that, if correctly steered, the vehicle has been steered past the obstacle 4 without its front colliding. If this is the case, the course determined for the rear of the vehicle by the steering angle of the rear wheels 3 will likewise reliably avoid a collision with the obstacle 4. If the driver sets a larger steering angle at the front wheels 2 after the halt, this would result in a larger steering angle being set at the rear wheels 3 too in normal mode. As the motion of the vehicle continued, the front of the vehicle would move away from the obstacle 4 relatively quickly but the rear of the vehicle would initially come closer to the obstacle 4, with the result that there would be the risk of a collision. According to the present invention, however, the rear-wheel steering angle (halt steering angle) set when halting is defined as the maximum steering angle for the rear wheels 3 in the drive-away mode, with the result that the rear of the vehicle substantially follows the uncritical outer trajectory 8 resulting from the curved path 5 when halting. It is quite possible that the vehicle will swing out slightly if the front-wheel steering angle is increased while the rear-wheel steering angle remains the same. However, the driver may readily control this effect by turning the steering in a moderate manner. It is clear that it is still possible to set angles smaller than the halt steering angle and it is thus possible, for example, to drive the vehicle 1 away from the halt in a straight line 10, which is indicated by an arrow and front and rear wheels illustrated in broken lines. If a larger steering angle is set at the front wheels 2, the vehicle may move away from the obstacle 4 more rapidly than would be the case in the normal mode.

If the vehicle 1 travels parallel to the obstacle 4 before coming to a halt, as in the case illustrated in FIG. 2, the rear wheels 3 have a steering angle of zero. According to the present invention, this steering angle is then determined as the halt steering angle, which then defines the maximum possible steering angle of the rear wheels 3. In this case, this means that the rear wheels 3 cannot perform any steering movement at all during the drive-away phase. The vehicle 1 therefore behaves like a vehicle without rear-wheel steering. Swinging out of the rear of the vehicle and hence dangers to the vehicle or to traffic are thus reduced. The driver may then move the vehicle away from the obstacle 4 like a conventional vehicle with unsteered rear wheels 3 by a moderate turn of the front wheels 2 corresponding to a curved path 11, which is indicated by an arrow and by front wheels illustrated by broken lines.

The vehicle steering system according to the present invention detects halting of the vehicle from the fact that a predetermined vehicle limiting speed is undershot. In addition, halting may also be linked to the opening of a door in the case of a bus. Provision may also be made, for example, to define the smallest steering angle that occurs at the rear wheels 3 before the vehicle finally comes to a standstill as the halt steering angle below a certain vehicle speed. This takes into account the case where the vehicle turns into a halt at a sharp steering angle at a speed lower than the abovementioned limiting speed but comes very close to a loading ramp or a curb, for example, with increasingly smaller steering angles before finally coming to a halt.

It is clear that the vehicle speed below which a halt is detected may also be greater than zero. This takes into account cases where the vehicle must travel through narrow streets or must pass close to an obstacle 4 when maneuvering. It is assumed that a relatively close approach to an obstacle 4 with the vehicle 1 and an abrupt change in direction will only be performed at relatively low speeds that are below the vehicle limiting speed for switching to the drive-away mode.

The switch from drive-away mode to normal mode occurs, for example, when the vehicle exceeds a certain limiting speed and when, furthermore, a steering angle smaller than the halt steering angle is first set at the rear wheels 3. This ensures that the transition between drive-away mode and normal mode occurs so that an abrupt change in the steering behavior is avoided and the transition is thus not noticed by the driver.

What is claimed is:

1. A nontrack-bound vehicle, comprising:
   arbitrarily steerable front wheels; and
   an additional rear-wheel steering system, the additional rear-wheel steering system one of operating automatically and being switchable to operate automatically, the additional rear-wheel steering system one of controlling and regulating a steering angle of rear wheels as a function of a steering angle of the front wheels and as a function of at least one further parameter, the additional rear-wheel steering system being configured to switch in a parameter-dependent manner between a drive-away mode and a normal mode;
   wherein, in the drive-away mode, the rear-wheel steering angle is one of controlled and regulated so that the rear wheels are not adjusted beyond a steering angle achieved when the vehicle was last halted.

2. The vehicle according to claim 1, wherein the steering angle achieved when the vehicle was last halted defines a halt steering angle.

3. The vehicle according to claim 1, wherein the at least one further parameter includes at least two further parameters, the at least two further parameters including a vehicle speed and a distance traveled.

4. The vehicle according to claim 1, wherein the additional rear-wheel steering system is configured to detect when the vehicle is being halted in accordance with a predetermined vehicle limiting speed being achieved.

5. A nontrack-bound vehicle, comprising:
   arbitrarily steerable front wheels; and
   an additional rear-wheel steering system, the additional rear-wheel steering system one of operating automatically and being switchable to operate automatically, the additional rear-wheel steering system one of controlling and regulating a steering angle of rear wheels as a function of a steering angle of the front wheels and as a function of at least one further parameter, the additional rear-wheel steering system being configured to switch in a parameter-dependent manner between a drive-away mode and a normal mode;
   wherein, in the drive-away mode, the rear-wheel steering angle is one of controlled and regulated so that the rear wheels are not adjusted beyond a steering angle achieved when the vehicle was last halted;
   wherein the steering angle achieved when the vehicle was last halted defines a halt steering angle; and
   wherein the additional rear-wheel steering system is configured to switch from the drive-away mode to the normal mode in accordance with the rear wheels achieving a steering angle that is smaller than the halt steering angle.

6. The vehicle according to claim 5, wherein, during forward travel, the additional rear-wheel steering system is configured to switch from the drive-away mode to the normal mode at a time that the vehicle has traveled a distance approximately corresponding to a distance between the front wheels and the rear wheels and the rear wheels achieve a steering angle that is less than the halt steering angle.

7. The vehicle according to claim 5, wherein the additional rear-wheel steering system is configured to switch from the drive-away mode to the normal mode at a time that the vehicle achieves a predetermined vehicle limiting speed and the rear wheels achieve a steering angle that is less than the halt steering angle.

8. A nontrack-bound vehicle, comprising:
   arbitrarily steerable front wheels; and
   an additional rear-wheel steering system, the additional rear-wheel steering system one of operating automatically and being switchable to operate automatically, the additional rear-wheel steering system one of controlling and regulating a steering angle of rear wheels as a function of a steering angle of the front wheels and as a function of at least one further parameter, the additional rear-wheel steering system being configured to switch in a parameter-dependent manner between a drive-away mode and a normal mode;
   wherein, in the drive-away mode, the rear-wheel steering angle is one of controlled and regulated so that the rear wheels are not adjusted beyond a steering angle achieved when the vehicle was last halted;
   wherein the steering angle achieved when the vehicle was last halted defines a halt steering angle;
   wherein the steering angle of the rear wheels is proportionally dependent on the steering angle of the front wheels up to a maximum steering angle; and
   wherein the steering angle of the rear wheels is constant when the steering angle of the front wheels exceeds the maximum steering angle, the halt steering angle corresponding to the maximum steering angle during the drive-away mode.

9. The vehicle according to claim 8, wherein the maximum steering angle defines a rear-wheel limiting steering angle.

10. The vehicle according to claim 9, wherein the proportionality between the steering angle of the rear wheels and the steering angles of the front wheels is dependent on a vehicle speed so that at a vehicle speed below a first speed limit value, a proportionality factor remains constant, so that at a vehicle speed between the first speed limit value and a higher second speed limit value, the proportionality factor decreases to a zero value, thereby resulting in the rear wheels being set to travel straight ahead, and so that at a vehicle speed above the second speed limit valve, the proportionality factor remains at the zero value.

11. A nontrack-bound vehicle, comprising:

arbitrarily steerable front wheels; and an additional rear-wheel steering system, the additional rear-wheel steering system one of operating automatically and being switchable to operate automatically, the additional rear-wheel steering system one of controlling and regulating a steering angle of rear wheels as a function of a steering angle of the front wheels and as a function of at least one further parameter, the additional rear-wheel steering system being configured to switch in a parameter-dependent manner between a drive-away mode and a normal mode;

wherein, in the drive-away mode, the rear-wheel steering angle is one of controlled and regulated so that the rear wheels are not adjusted beyond a steering angle achieved when the vehicle was last halted;

wherein the steering angle achieved when the vehicle was last halted defines a halt steering angle; and wherein the halt steering angle is determined when halting in forward motion and when halting in reverse motion and wherein the halt steering angle is maintained in the drive-away mode when the vehicle travels forwardly and when the vehicle travels backwardly.

12. A nontrack-bound vehicle, comprising:

arbitrarily steerable front wheels; and an additional rear-wheel steering system, the additional rear-wheel steering system one of operating automatically and being switchable to operate automatically, the additional rear-wheel steering system one of controlling and regulating a steering angle of rear wheels as a function of a steering angle of the front wheels and as a function of at least one further parameter, the additional rear-wheel steering system being configured to switch in a parameter-dependent manner between a drive-away mode and a normal mode;

wherein, in the drive-away mode, the rear-wheel steering angle is one of controlled and regulated so that the rear wheels are not adjusted beyond a steering angle achieved when the vehicle was last halted;

wherein the steering angle achieved when the vehicle was last halted defines a halt steering angle; and wherein an absolute value of the halt steering angle is maintained so that in the drive-away mode, the rear wheels are not adjusted beyond the absolute value of the halt steering angle either when turned to the left or to the right.

13. A nontrack-bound vehicle, comprising:

arbitrarily steerable front wheels; and an additional rear-wheel steering system, the additional rear-wheel steering system configured to one of operate automatically and to be switched to operate automatically, the additional rear-wheel steering system configured to one of control and regulate a steering angle of rear wheels as a function of a steering angle of the front wheels and as a function of at least one further parameter, the additional rear-wheel steering system configured to switch in a parameter-dependent manner between a drive-away mode and a normal mode;

wherein, in the drive-away mode, the rear-wheel steering angle is one of controlled and regulated so that the rear wheels are not adjusted beyond a steering angle achieved when the vehicle was last halted.

* * * * *

UNITED STATES PATENT AND TRADEMARK OFFICE
CERTIFICATE OF CORRECTION

PATENT NO. : 6,615,944 B1
DATED : September 9, 2003
INVENTOR(S) : Horwath et al.

It is certified that error appears in the above-identified patent and that said Letters Patent is hereby corrected as shown below:

<u>Title page, Item [54], and Column 1, lines 1and 2,</u>
Please change the title from "VEHICLE WITH AUXILIARY REAR WHEEL STEERING MECHANISM" to -- VEHICLE WITH ADDITIONAL REAR-WHEEL STEERING --.

Signed and Sealed this

Twenty-seventh Day of July, 2004

JON W. DUDAS
*Acting Director of the United States Patent and Trademark Office*